United States Patent Office 2,863,930
Patented Dec. 9, 1958

2,863,930

ALKYLATION OF DITOLYLALKANES

William Frank Marzluff and Harry Addison Smith, Stamford, Conn., assignors to American Cyanamid Company, New York, N. Y., a corporation of Maine No Drawing. Application February 28, 1956
Serial No. 568,182

13 Claims. (Cl. 260—668)

This invention relates to a new and novel improved alkylation reaction. More particularly, it relates to the selective alkylation of those ditolylalkanes characterized by the general formula:

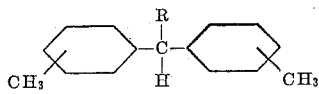

in which R is defined as a hydrogen and alkyl radical. Still more particularly, the invention concerns itself with a novel reaction between the above characterized ditolylalkanes and non-conjugated olefinic hydrocarbons in the presence of a catalyst consisting of an alkali metal under controlled temperature reaction conditions to avoid the alkylation of the "$CH_3$" and the "R" radical when "R" is an alkyl radical.

The alkylated ditolylalkanes produced by the process of the invention are characterized by the formula:

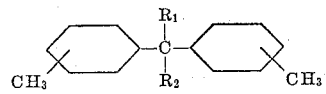

in which $R_1$ and $R_2$ are each alkyl radicals, which may be the same or different.

The latter ditolylalkanes are useful intermediates in the preparation of a commercially important class of new resins. These are more fully described in and forms the subject matter of a copending application of John C. Petropoulos for United States Letters Patent, Serial No. 523,355, filed on July 20, 1955. More specifically, that application is directed to the oxidation of alkylated ditolylalkanes to the corresponding alkylated dibenzoic acid which is thereafter esterified with a suitable polyhydric alcohol to obtain novel and useful resins.

However, serious difficulties have been experienced in preparing alkylated ditolylalkanes of the type characterized above. In alkylation processes presently known, substantial alkylation of the methyl groups occurs in the "tolyl" portion of the molecule along with the alkylation of the bridging radical

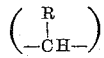

Consequently, the methyl groups in the "tolyl" portion of the molecule cannot be readily oxidized to the corresponding dibenzoic acid. For example, in one method described in British specification 734,128, diphenylethane is said to react with ethylene in the presence of an alkaline catalyst at temperatures between 150° C. and 500° C. under superatmospheric pressure. Unfortunately, for reasons which are not clearly understood, alkylation of ditolylalkanes of the type defined above does not occur at all at reaction temperatures between 150° C. and 170° C. However, alkylation does occur at temperatures in excess of about 170° C. At such elevated temperatures, the methyl group in the "tolyl" portion of the molecule is caused to alkylate to form higher alkyl ring substituents. Accordingly, such ring alkylated products cannot be converted to the desired dibenzoic acid intermediate.

It is a principal object of the present invention, therefore, to provide a new and novel improved catalytic alkylation reaction. It is a further object to provide a process for accomplishing selective alkylation of ditolylalkanes to prepare alkylated products, capable of conversion to correspondingly useful benzoic acids.

These and other objects are attained in a convenient and straight-forward manner. It has been unexpectedly found that selective alkylation can be accomplished in a series of controlled operating conditions involving close regulation of heat supply to the ditolylalkane to be treated. In this manner, selective alkylation can be effectuated.

According to the present invention, the overall process contemplates a series of steps which involve:

(1) Controlled heating of a ditolylalkane, as defined above, in the presence of a catalyst consisting of an alkali metal, (2) Cooling the thus-heated mixture, and (3) Reacting the latter mixture with a non-conjugated olefinic hydrocarbon under superatmospheric pressure.

In step (1), the ditolylalkane is heated to a temperature of from about 200° C. to about 250° C. in the presence of a catalyst for at least ten minutes. In step (2), resultant mixture is cooled to below about 170° C. and is then reacted with an olefinic hydrocarbon in step (3) under superatmospheric pressures, and preferably in an inert atmosphere such as nitrogen, whereby an alkylated product is obtained. The "methyl" groups in the so-obtained ditolylalkane molecule are substantially unaffected.

It is an advantage of the present invention that observations relating to the critical conditions of reaction such as, for example, temperature and time can be made by an unskilled operator. Although such conditions are critical, wide tolerances are permitted. For example, while in the initial heating operation an optimum temperature range of from 220° C. to 230° C. is preferred, it is an advantage that temperatures as low as 200° C. or as high as 250° C. can be effectively employed for from ten minutes to as much as two hours or more without deleteriously affecting the structure of the ditolylalkane molecule. In the cooling operation, it too is readily achieved within a rather wide range of temperatures from about 150° C. to 170° C. although temperatures of from 160° C. to 165° C. are preferred. The temperature at which cooling is effected is then maintained during reaction with a non-conjugated olefin under a wide range of pressures. In general, pressures of from 30 p. s. i. to 15,000 p. s. i., and preferably from 300 p. s. i. to 1000 p. s. i., are suitable. Usually, total reaction occurs within three to five hours.

A wide variety of ditolylalkanes can be alkylated in accordance with the process of the invention. More particularly, ditolylalkanes that correspond to the general formula:

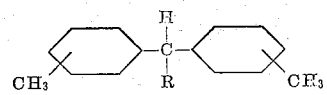

in which R is defined as a hydrogen and alkyl radical, can be alkylated while avoiding conversion of the "$CH_3$" group. Some of the more typically illustrative of such ditolylalkanes are:

Bis(p-tolyl)methane
1,1-di(p-tolyl)ethane
1-(4-methyl phenyl)-1-(2-methyl phenyl)ethane
1,1-di(p-tolyl)propane
1-(4-methyl phenyl)-1-(2-methyl phenyl)propane
1,1-di(p-tolyl)butane
1-(4-methyl phenyl)-1-(2-methyl phenyl)butane and mixtures of the foregoing compounds, such as for example: 1,1-di(p-tolyl)ethane and 1-(4-methyl phenyl)-1-(2-methyl phenyl)-ethane in varying proportions.

A number of diverse non-conjugated olefinic hydrocarbons are within the purview of the invention. As specific olefinic hydrocarbons may be mentioned: ethylene, propylene, butenes, pentenes and hexenes. When ethylene is, for example, the alkylating agent, a high pressure range is selected, usually between 300 p. s. i. and 1000 p. s. i., for the reason that the vapor pressure of the olefin at the temperature of reaction is quite high.

Any alkali metal or mixture of alkali metals is satisfactory as the catalyst. For example, lithium, sodium, potassium and the like are suitable. In general, the use of sodium in a suspension, such as benzene or toluene is preferred. The amount of catalyst employed will vary from between about 0.01% to 10% by weight of the ditolylalkane used. At higher pressures, smaller amounts of catalyst can be used. It is a good practice, however, to employ of from 1% to 5%.

The invention will be illustrated further in the following examples which are not be taken as limitative thereof. Unless otherwise stated, the parts are by weight.

*Example 1*

A mixture comprising 52.5 parts of 1,1-di(4-tolyl)ethane and 4 parts of 50% sodium dispersion in toluene is introduced into an autoclave and heated to 225° C. for one hour with agitation. The autoclave is then cooled to 165° C. Ethylene is added to a pressure of 925 p. s. i. After two and one-half hours, the autoclave is allowed to cool to about 25°C.; the reaction mixture is fractionated at 15 mm. Hg pressure. A good yield of 2,2-di(4-tolyl)butane is obtained.

*Example 2*

The procedure of the foregoing example is followed in every material detail except that a mixture comprising 43 parts of 1,1-(4-tolyl)ethane and 9.5 parts of 1-(2-methyl phenyl)-1-(4-methyl phenyl)ethane is substituted for the ditolylethane reactant of that example. A good yield of the corresponding butane derivatives are obtained in admixture.

*Example 3*

50 parts of 1,1-di(4-tolyl)propane in admixture with 2 parts of a 50% potassium dispersion in benzene are fed into an autoclave. The mixture is heated with agitation at 220° C. for one-half hour. The mixture is next cooled. Propylene is added to a pressure of 850 p. s. i. The reaction is completed within two hours. The autoclave is cooled to 25° C. and the contents therein are fractionated at reduced pressure (15 mm. Hg) to obtain 3,3-di(4-tolyl)hexane.

In place of the 1,1-di(4-tolyl)propane of the foregoing example, bis(4-tolyl)methane is substituted therefor and the example is repeated in every material aspect. A good yield of 3,3-di(4-tolyl)heptane is obtained.

What is claimed is:

1. In a process for reacting a ditolylalkane characterized by the general formula:

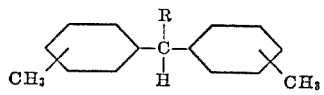

wherein R is a radical selected from the group consisting of hydrogen and lower alkyl, with an olefinic hydrocarbon of from 2 to 6 carbon atoms in the presence of an alkali metal catalyst, the improvement therein which comprises: heating said ditolylalkane in the presence of a catalyst consisting of an alkali metal at a temperature between 200° C. and 250° C. for at least ten minutes but not more than about two hours, cooling the resultant mixture comprising the heated ditolylalkane and alkali metal catalyst to below about 170° C., reacting the latter cooled mixture with a non-conjugated olefinic hydrocarbon of from 2 to 6 carbon atoms under superatmospheric pressure and at a temperature ranging from about 150° C. to about 170° C., and recovering an alkylated product of the general formula:

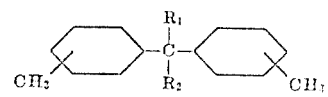

wherein $R_1$ and $R_2$ each represents a lower alkyl radical.

2. The process according to claim 1 in which the ditolylalkane is 1,1-di(p-tolyl)ethane.

3. The process according to claim 1 in which the ditolylalkane is 1-(4-methyl phenyl)-1-(2-methyl phenyl) ethane.

4. The process according to claim 1 in which the ditolylalkane is a mixture comprising 1,1-di(p-tolyl)ethane and 1-(4-methyl phenyl)-1-(2-methyl phenyl) ethane.

5. The process according to claim 1 in which the alkali metal catalyst is sodium.

6. The process according to claim 1 in which the alkali metal catalyst is potassium.

7. The process according to claim 1 in which the ditolylalkane and alkali metal catalyst in admixture are heated to from between 220° C. and 230° C.

8. The process according to claim 1 in which the heated ditolylalkane and alkali metal catalyst mixture is cooled to between about 160° C. and 165° C.

9. The process according to claim 1 in which the superatmospheric pressure is adjusted between 300 and 1000 pounds per square inch.

10. The process according to claim 1 in which the olefinic hydrocarbon is ethylene.

11. The process according to claim 1 in which the olefinic hydrocarbon is propylene.

12. The process according to claim 1 in which the reaction takes place in the presence of an inert atmosphere.

13. The process according to claim 1 in which from 0.01% to 10% of alkali metal catalyst by weight based on the ditolylalkane employed is added.

References Cited in the file of this patent

UNITED STATES PATENTS

| | | |
|---|---|---|
| 2,448,641 | Whitman | Sept. 7, 1948 |
| 2,500,369 | McCoubrey et al. | Mar. 14, 1950 |
| 2,670,390 | Pines et al. | Feb. 23, 1954 |
| 2,769,850 | Closson et al. | Nov. 6, 1956 |

FOREIGN PATENTS

| | | |
|---|---|---|
| 734,128 | Great Britain | July 27, 1955 |
| 552,628 | Canada | Mar. 13, 1956 |